(12) United States Patent
Rached

(10) Patent No.: US 9,267,064 B2
(45) Date of Patent: *Feb. 23, 2016

(54) TERNARY COMPOSITIONS FOR HIGH-CAPACITY REFRIGERATION

(75) Inventor: Wissam Rached, Chaponost (FR)

(73) Assignee: ARKEMA FRANCE, Colombes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/390,379

(22) PCT Filed: Aug. 20, 2010

(86) PCT No.: PCT/FR2010/051745
§ 371 (c)(1),
(2), (4) Date: Feb. 14, 2012

(87) PCT Pub. No.: WO2011/030031
PCT Pub. Date: Mar. 17, 2011

(65) Prior Publication Data
US 2012/0153213 A1    Jun. 21, 2012

(30) Foreign Application Priority Data

Sep. 11, 2009   (FR) ..................................... 09 56248

(51) Int. Cl.
C09K 5/04 (2006.01)
C09K 3/30 (2006.01)
C08J 9/14 (2006.01)

(52) U.S. Cl.
CPC . C09K 3/30 (2013.01); C08J 9/146 (2013.01); C09K 5/045 (2013.01); C08J 2207/04 (2013.01); C09K 2205/126 (2013.01); C09K 2205/22 (2013.01)

(58) Field of Classification Search
CPC ............. C09K 5/045; C09K 2205/126; C09K 2205/22
See application file for complete search history.

(56) References Cited

U.S. PATENT DOCUMENTS

| | | | |
|---|---|---|---|
| 8,070,977 B2 | 12/2011 | Rached | |
| 8,075,798 B2 | 12/2011 | Rached | |
| 8,246,850 B2 | 8/2012 | Rached | |
| 8,252,198 B2 | 8/2012 | Rached | |
| 8,557,135 B2 | 10/2013 | Rached | |
| 8,808,569 B2 | 8/2014 | Rached | |
| 8,858,825 B2 | 10/2014 | Guerin et al. | |
| 2006/0243944 A1 | 11/2006 | Minor et al. | |
| 2008/0184731 A1 | 8/2008 | Sienel et al. | |
| 2008/0230738 A1 | 9/2008 | Minor et al. | |
| 2008/0314073 A1 | 12/2008 | Minor | |
| 2009/0120619 A1 | 5/2009 | Sievert et al. | |
| 2009/0253820 A1 | 10/2009 | Bowman et al. | |
| 2010/0044619 A1 | 2/2010 | Hulse | |
| 2011/0084228 A1 | 4/2011 | Rached | |
| 2011/0095224 A1 | 4/2011 | Rached | |
| 2011/0186772 A1 | 8/2011 | Rached | |
| 2011/0219791 A1 | 9/2011 | Rached | |
| 2011/0219792 A1 | 9/2011 | Rached | |
| 2011/0240254 A1 | 10/2011 | Rached | |
| 2011/0258147 A1 | 10/2011 | Low | |
| 2011/0284181 A1 | 11/2011 | Rached | |
| 2012/0049104 A1 | 3/2012 | Rached | |
| 2012/0056123 A1 | 3/2012 | Rached | |
| 2012/0068105 A1 | 3/2012 | Rached et al. | |
| 2012/0097885 A9 | 4/2012 | Hulse et al. | |
| 2012/0126187 A1 | 5/2012 | Low | |
| 2012/0144857 A1 | 6/2012 | Rached | |
| 2012/0151958 A1 | 6/2012 | Rached | |
| 2012/0151959 A1 | 6/2012 | Rached | |
| 2012/0153213 A1 | 6/2012 | Rached | |
| 2012/0159982 A1 | 6/2012 | Rached | |
| 2012/0161064 A1 | 6/2012 | Rached | |
| 2012/0167615 A1 | 7/2012 | Rached | |
| 2012/0205574 A1 | 8/2012 | Rached et al. | |
| 2012/0255316 A1 | 10/2012 | Andre et al. | |
| 2012/0298909 A1 | 11/2012 | Low | |
| 2013/0055733 A1 | 3/2013 | Rached | |
| 2013/0055739 A1 | 3/2013 | Rached | |
| 2013/0096218 A1 | 4/2013 | Rached | |
| 2013/0105724 A1 | 5/2013 | Boussand | |
| 2013/0145778 A1 | 6/2013 | Motta et al. | |
| 2013/0186114 A1 | 7/2013 | Guerin et al. | |
| 2014/0008565 A1 | 1/2014 | Rached et al. | |
| 2014/0075969 A1 | 3/2014 | Guerin et al. | |

(Continued)

FOREIGN PATENT DOCUMENTS

| DE | 202007008291 U1 | 11/2007 |
|---|---|---|
| FR | 2 182 956 | 12/1973 |

(Continued)

OTHER PUBLICATIONS

Written Opinion (English translation) mailed Apr. 4, 2012 in PCT/FR2010/051745.
International Search Report (English translation) mailed Jan. 12, 2011 in PCT/FR2010/051745.
U.S. Appl. No. 14/371,118, Boussand.
Boussand, Béatrice, U.S. Appl. No. 14/371,118 entitled "Heat Transfer Compositions Having Improved Miscibility With Lubricating Oil," filed in the U.S. Patent and Trademark Office on Jul. 8, 2014.
Rached, Wissam, U.S. Appl. No. 14/823,430 entitled "Use of Ternary Compositions," filed in the U.S. Patent and Trademark Office on Aug. 11, 2015.

(Continued)

*Primary Examiner* — John Hardee
(74) *Attorney, Agent, or Firm* — Buchanan Ingersoll & Rooney P.C.

(57) ABSTRACT

The invention relates to compositions containing 2,3,3,3-tetrafluoropropene and to the uses thereof as heat transfer fluid, expansion agents, solvents and aerosol. The invention specifically relates to compositions essentially containing between 15 and 50 wt. % of 2,3,3,3-tetrafluoropropene, between 5 and 40 wt. % of HFC-134a and between 45 and 60 wt. %, preferably between 45 and 50 wt. %, of HFC-32.

14 Claims, No Drawings

(56) References Cited

U.S. PATENT DOCUMENTS

| | | |
|---|---|---|
| 2014/0318160 A1 | 10/2014 | Rached |
| 2014/0326017 A1 | 11/2014 | Rached |

FOREIGN PATENT DOCUMENTS

| | | |
|---|---|---|
| FR | 2 256 381 | 7/1975 |
| JP | 58-104466 A | 6/1983 |
| JP | 2008-531836 A | 8/2008 |
| JP | 2009-532520 A1 | 9/2009 |
| WO | WO 2004/037913 A2 | 5/2004 |
| WO | WO 2005/105947 A2 | 11/2005 |
| WO | WO 2006/094303 A2 | 9/2006 |
| WO | WO 2006/101563 A2 | 9/2006 |
| WO | WO 2006/101563 A3 | 9/2006 |
| WO | WO 2007/126414 A2 | 11/2007 |
| WO | WO 2007/126414 A3 | 11/2007 |
| WO | 2008/009928 A2 | 1/2008 |
| WO | 2008009922 A2 | 1/2008 |
| WO | WO 2008/009923 A2 | 1/2008 |
| WO | WO 2008/009928 A2 | 1/2008 |
| WO | 2010002023 A1 | 1/2010 |
| WO | WO 2010/000993 A2 | 1/2010 |
| WO | WO 2010/059677 A2 | 5/2010 |
| WO | 2011023923 A1 | 3/2011 |

OTHER PUBLICATIONS

Rached, Wissam, U.S. Appl. No. 14/830,130 entitled "Binary Refrigerating Fluid," filed in the U.S. Patent and Trademark Office on Aug. 19, 2015.

Bonnet, Phillippe, et al., U.S. Appl. No. 14/772,950 entitled "Composition Comprising HF and 2,3,3,3-Tetrafluoropropene," filed in the U.S. Patent and Trademark Office on Sep. 4, 2015.

Rached, Wissam, U.S. Appl. No. 14/873,855 entitled "Heat Transfer Fluid," filed in the U.S. Patent and Trademark Office on Oct. 2, 2015.

Rached, Wissam, U.S. Appl. No. 14/873,891 entitled "Ternary Compositions for Low-Capacity Refrigeration," filed in the U.S. Patent and Trademark Office on Oct. 2, 2015.

TERNARY COMPOSITIONS FOR HIGH-CAPACITY REFRIGERATION

FIELD OF THE INVENTION

The present invention relates to compositions containing 2,3,3,3-tetrafluoropropene and uses thereof as heat-transfer fluids, blowing agents, solvents and aerosols.

BACKGROUND OF THE INVENTION

The problems posed by substances which delete the atmospheric ozone layer (ODP: ozone depletion potential) were addressed in Montreal, where the protocol imposing a reduction in the production and use of chlorofluorocarbons (CFCs) was signed. This protocol has been the subject of amendments which have required that CFCs be withdrawn and have extended regulatory control to other products, including hydrochlorofluorocarbons (HCFCs).

The refrigeration and air-conditioning industry has invested a great deal in the replacement of these refrigerants, and as a result, hydrofluorocarbons (HFCs) have been marketed.

The (hydro)chlorofluorocarbons used as blowing agents or solvents have also been replaced with HFCs.

In the automotive industry, the air-conditioning systems for vehicles sold in many countries have changed from a chlorofluorocarbon (CFC-12) refrigerant to a hydrofluorocarbon (1,1,1,2-tetrafluoroethane: HFC-134a) refrigerant which is less harmful to the ozone layer. However, from the viewpoint of the objectives set by the Kyoto protocol, HFC-134a (GWP=1300) is considered to have a high warming potential. The contribution to the greenhouse effect of a fluid is quantified by a criterion, the GWP (global warming potential) which indexes the warming potential by taking a reference value of 1 for carbon dioxide.

Since carbon dioxide is non-toxic and non-flammable and has a very low GWP, it has been proposed as a refrigerant in air-conditioning systems as a replacement for HFC-134a. However, the use of carbon dioxide has several drawbacks, in particular linked to the very high pressure at which it is used as a refrigerant in the existing apparatuses and technologies.

Document WO 2004/037913 discloses the use of compositions comprising at least one fluoroalkene having three or four carbon atoms, in particular pentafluoropropene and tetrafluoropropene, preferably having a GWP at most of 150, as heat-transfer fluids.

Document WO 2005/105947 teaches the addition to tetrafluoropropene, preferably 1,3,3,3-tetrafluoropropene, of a blowing coagent such as difluoromethane, pentafluoroethane, tetrafluoroethane, difluoroethane, heptafluoropropane, hexafluoropropane, pentafluoropropane, pentafluorobutane, water and carbon dioxide.

Document WO 2006/094303 discloses binary compositions of 2,3,3,3-tetrafluoropropene (HFO-1234yf) with difluoromethane (HFC-32), and of 2,3,3,3-tetrafluoropropene with 1,1,1,2-tetrafluoroethane (HFC-134a).

Quaternary mixtures comprising 1,1,1,2,3-pentafluoropropene (HFO-1225ye) in combination with difluoromethane, 2,3,3,3-tetrafluoropropene and HFC-134a were disclosed in this document. However, 1,1,1,2,3-pentafluoropropene is toxic.

Quaternary mixtures comprising 2,3,3,3-tetrafluoropropene in combination with iodotrifluoromethane ($CF_3I$), HFC-32 and HFC-134a have also been disclosed in document WO 2006/094303. However, $CF_3I$ has a non-zero ODP and poses stability and corrosion problems.

DETAILED DESCRIPTION OF THE INVENTION

The applicant has now developed 2,3,3,3-tetrafluoropropene compositions which do not have the abovementioned drawbacks and have both a zero ODP and a GWP which is lower than that of the existing heat-transfer fluids such as R410A (binary mixture of pentafluoroethane (50% by weight) and HFC-32 (50% by weight)).

The compositions used as a heat-transfer fluid in the present invention have a critical temperature greater than 87° C. (critical temperature of R410A is 70.5° C.). These compositions can be used in heat pumps for providing heat at temperatures up to 65° C. but also at higher temperatures up to 87° C. (temperature range at which R410A cannot be used).

The compositions used as heat-transfer fluid in the present invention have temperatures at the compressor outlet equivalent to the values given by R-410A. The condenser pressures are lower than the pressures of R-410A and the compression ratios are also lower. These compositions can replace R-410A without changing compressor technology.

The compositions used as a heat-transfer fluid in the present invention have saturation vapor densities which are less than the saturated vapor density of R410A. The volumetric capacities given by these compositions are equivalent to the volumetric capacity of R410A (between 90 and 99%). By virtue of these properties, these compositions can operate with smaller pipe diameters and therefore less pressure drop in the steam pipework, thereby increasing the performance levels of the equipment.

The compositions according to the present invention are characterized in that they essentially contain from 15 to 50% by weight of 2,3,3,3-tetrafluoropropene, from 5 to 40% by weight of HFC-134a and from 45 to 60% by weight, preferably from 45 to 50% by weight of HFC-32.

The compositions according to the present invention can be used as heat-transfer fluids, preferably in compression systems and advantageously with exchangers operating in counterflow mode or in cross-flow mode with counterflow tendency. They are particularly suitable for systems of high-capacity refrigeration per unit volume swept by the compressor.

In compression systems, the heat exchange between the refrigerant and the heat sources takes place by means of heat-transfer fluids. These heat-transfer fluids are in the gaseous state (the air in air-conditioning and direct expansion refrigeration), liquid state (the water in domestic heat pumps, glycolated water) or two-phase state.

There are various modes of transfer:
- the two fluids are arranged in parallel and travel in the same direction: co-flow (antimethodic) mode;
- the two fluids are arranged in parallel but travel in the opposite direction: counterflow (methodic) mode;
- the two fluids are positioned perpendicularly: cross-flow mode. The cross-flow may be with co-flow or counterflow tendency;
- one of the two fluids makes a U-turn in a wider pipe, which the second fluid passes through. This configuration is comparable to a co-flow exchanger over half the length, and for the other half, to a counterflow exchanger: pinhead mode.

The compositions according to the present invention are advantageously used in stationary air conditioning, preferably as a replacement for R-410A.

The compositions according to the present invention can be stabilized. The stabilizer preferably represents at most 5% by weight relative to the total composition.

As stabilizers, mention may in particular be made of nitromethane, ascorbic acid, terephthalic acid, azoles such as tolutriazole or benzotriazole, phenolic compounds such as tocopherol, hydroquinone, t-butyl hydroquinone or 2,6-di-tert-butyl-4-methylphenol, epoxides (alkyl, optionally fluorinated or perfluorinated, or alkenyl or aromatic) such as n-butyl glycidyl ether, hexanediol diglycidyl ether, allyl glycidyl ether or butylphenyl glycidyl ether, phosphites, phosphates, phosphonates, thiols and lactones.

The compositions according to the present invention, as a heat-transfer agent, can be employed in the presence of lubricants such as mineral oil, alkylbenzene, polyalkylene glycol and polyvinyl ether.

The compositions according to the present invention can also be used as blowing agents, aerosols and solvents.

EXPERIMENTAL SECTION

Calculation Tools

The RK-Soave equation is used for calculating the densities, enthalpies, entropies and liquid/vapor equilibrium data of the mixtures. The use of this equation requires knowledge of the properties of the pure bodies used in the mixtures in question and also the interaction coefficients for each binary mixture.

The data required for each pure body are:

The boiling point, the critical temperature and the critical pressure, the curve of pressure as a function of temperature starting from the boiling point up to the critical point, and the saturated liquid and saturated vapor densities as a function of temperature.

HFC-32, HFC-134a:

The data on these products are published in the ASHRAE Handbook 2005 chapter 20, and are also available from Refrop (software developed by NIST for calculating the properties of refrigerants).

HFO-1234yf:

The data of the temperature-pressure curve for HFO-1234yf are measured by the static method. The critical temperature and the critical pressure are measured using a C80 calorimeter sold by Setaram. The densities, at saturation as a function of temperature, are measured using the vibrating tube densitometer technology developed by the laboratories of the Ecole des Mines of Paris.

Interaction Coefficient of the Binary Mixtures

The RK-Soave equation uses binary interaction coefficients to represent the behavior of the products in mixtures. The coefficients are calculated as a function of the experimental liquid/vapor equilibrium data.

The technique used for the liquid/vapor equilibrium measurements is the static-cell analytical method. The equilibrium cell comprises a sapphire tube and is equipped with two electromagnetic ROLSI™ samplers. It is immersed in a cryo-thermostat bath (HUBER HS40). A magnetic stirrer with a field drive rotating at varying speed is used to accelerate reaching the equilibria. The analysis of the samples is carried out by gas chromatography (HP5890 series II) using a katharometer (TCD).

HFC-32/HFO-1234yf, HFC-134a/HFO-1234yf:

The liquid/vapor equilibrium measurements on the binary mixture HFC-32/HFO-1234yf are carried out for the following isotherms: −10° C., 30° C. and 70° C.

The liquid/vapor equilibrium measurements on the binary mixture HFC-134a/HFO-1234yf are carried out for the following isotherms: 20° C.

HFC-32/HFO-134a:

The liquid/vapor equilibrium data for the binary mixture HFC-134a/HFC-32 are available from Refprop. Two isotherms (−20° C. and 20° C.) and one isobar (30 bar) are used to calculate the interaction coefficients for this binary mixture.

Compression System

A compression system equipped with a counterflow condenser and evaporator, with a screw compressor and with an expansion valve is considered.

The system operates with 15° C. of overheat and 5° C. of undercooling. The minimum temperature difference between the secondary fluid and the refrigerant is considered to be about 5° C.

The isentropic efficiency of the compressors depends on the compression ratio. This efficiency is calculated according to the following equation:

$$\eta_{isen} = a - b(\tau - c)^2 - \frac{d}{\tau - e} \tag{1}$$

For a screw compressor, the constants a, b, c, d and e of the isentropic efficiency equation (1) are calculated according to the standard data published in the "Handbook of air conditioning and refrigeration, page 11.52".

The % CAP is the percentage of the ratio of the volumetric capacity supplied by each product over the capacity of R410A.

The coefficient of performance (COP) is defined as being the useful power supplied by the system over the power provided or consumed by the system.

The Lorenz coefficient of performance (COPLorenz) is a reference coefficient of performance. It is a function of temperatures and is used for comparing the COPs various fluids.

The Lorenz coefficient of performance is defined as follows:

(The temperatures T are in K)

$$T_{average}^{condenser} = T_{inlet}^{condenser} - T_{outlet}^{condenser} \tag{2}$$

$$T_{average}^{evaporator} = T_{outlet}^{evaporator} - T_{inlet}^{evaporator} \tag{3}$$

The Lorenz COP in the case air-conditioning and refrigeration is:

$$COPlorenz = \frac{T_{average}^{evaporator}}{T_{average}^{condenser} - T_{average}^{evaporator}} \tag{4}$$

The Lorenz COP in the case of heating is:

$$COPlorenz = \frac{T_{average}^{condenser}}{T_{average}^{condenser} - T_{average}^{evaporator}}. \tag{5}$$

For each composition, the coefficient of performance of the Lorenz cycle is calculated as a function of the corresponding temperatures.

The % COP/COPLorenz is the ratio of the COP of the system relative to the COP of the corresponding Lorenz cycle.

Heating Mode Results

In heating mode, the compression system operates between a temperature for inlet of the refrigerant into the evaporator of −5° C. and a temperature for inlet of the refrigerant into the condenser of 50° C. The system supplies heat at 45° C.

The performance levels of the compositions according to the invention under the heating mode operating conditions are given in table 1. The values of the constituents (HFO-1234yf, HFC-32, HFC-134a) for each composition are given as percentage by weight.

TABLE 1

| HFO-1234yf | HFC-32 | HFC-134a | Evap outlet temp (° C.) | Comp outlet temp (° C.) | Cond outlet T (° C.) | Evap P (bar) | Cond P (bar) | Ratio (w/w) | Glide | Comp efficiency | % CAP | % COP/COPLorenz |
|---|---|---|---|---|---|---|---|---|---|---|---|---|
| R410A | | | | | | | | | | | | |
| | | | −5 | 101 | 50 | 6.8 | 30.6 | 4.5 | 0.07 | 79.6 | 100 | 58.8 |
| 45 | 50 | 5 | −2 | 97 | 46 | 5.8 | 24.8 | 4.2 | 3.18 | 80.3 | 92 | 62.9 |
| 40 | 55 | 5 | −2 | 101 | 47 | 6.0 | 25.8 | 4.3 | 2.63 | 80.1 | 95 | 62.6 |
| 25 | 50 | 25 | −1 | 99 | 46 | 5.6 | 23.7 | 4.3 | 3.74 | 80.2 | 91 | 64.1 |
| 20 | 55 | 25 | −2 | 102 | 46 | 5.7 | 24.5 | 4.3 | 3.47 | 80.1 | 93 | 63.8 |
| 15 | 60 | 25 | −2 | 106 | 47 | 5.8 | 25.2 | 4.3 | 3.23 | 80.0 | 95 | 63.5 |

Cooling or Air-Conditioning Mode Results

In cooling mode, the compression system operates between a temperature for inlet of the refrigerant into the evaporator of −5° C. and a temperature for inlet of the refrigerant into the condenser of 50° C. The system supplies refrigeration at 0° C.

The performance levels of the compositions according to the invention under the cooling mode operating conditions are given in table 2. The values of the constituents (HFO-1234yf, HFC-32, HFC-134a) for each composition are given as percentage by weight.

TABLE 2

| HFO-1234yf | HFC-32 | HFC-134a | Evap outlet temp (° C.) | Comp outlet temp (° C.) | Cond outlet T (° C.) | Evap P (bar) | Cond P (bar) | Ratio (w/w) | Glide | Comp efficiency | % CAP | % COP/COPLorenz |
|---|---|---|---|---|---|---|---|---|---|---|---|---|
| R410A | | | | | | | | | | | | |
| | | | −5 | 101 | 50 | 6.8 | 30.6 | 4.5 | 0.07 | 79.6 | 100 | 50.4 |
| 50 | 45 | 5 | −1 | 94 | 45 | 5.7 | 23.7 | 4.2 | 3.76 | 80.5 | 92 | 55.5 |
| 45 | 50 | 5 | −2 | 97 | 46 | 5.8 | 24.8 | 4.2 | 3.18 | 80.3 | 95 | 55.1 |
| 40 | 55 | 5 | −2 | 101 | 47 | 6.0 | 25.8 | 4.3 | 2.63 | 80.1 | 98 | 54.8 |
| 30 | 45 | 25 | −1 | 96 | 46 | 5.4 | 22.9 | 4.2 | 4.04 | 80.3 | 92 | 56.7 |
| 25 | 50 | 25 | −1 | 99 | 46 | 5.6 | 23.7 | 4.3 | 3.74 | 80.2 | 94 | 56.4 |
| 20 | 55 | 25 | −2 | 102 | 46 | 5.7 | 24.5 | 4.3 | 3.47 | 80.1 | 97 | 56.2 |
| 15 | 60 | 25 | −2 | 106 | 47 | 5.8 | 25.2 | 4.3 | 3.23 | 80.0 | 99 | 55.9 |
| 15 | 45 | 40 | −1 | 98 | 45 | 5.2 | 22.1 | 4.3 | 4.48 | 80.2 | 90 | 57.3 |

The invention claimed is:

1. A compression refrigeration system comprising exchangers operating in counterflow mode containing a heat-transfer fluid, the heat transfer fluid consisting of:
   from 15 to 45% by weight of 2,3,3,3-tetrafluoropropene;
   from 5 to 25% by weight of HFC-134a;
   from 50 to 60% by weight of HFC-32;
   optionally, a lubricant; and
   optionally, a stabilizer.

2. The compression refrigeration system as claimed in claim 1, wherein the heat transfer fluid has a lubricant.

3. The compression refrigeration system as claimed in claim 1, wherein the heat transfer fluid has a stabilizer.

4. The compression refrigeration system as claimed in claim 1, wherein the heat transfer fluid is non-toxic.

5. The compression refrigeration system as claimed in claim 1, wherein the heat transfer fluid has an ozone depletion potential of zero.

6. The compression refrigeration system as claimed in claim 1, wherein the composition contains from 55 to 60% by weight of HFC-32.

7. A process of transferring heat between exchangers operating in counterflow mode, the process comprising transferring heat with a heat-transfer fluid, the heat transfer fluid consisting of:
   from 15 to 45% by weight of 2,3,3,3-tetrafluoropropene;
   from 5 to 25% by weight of HFC-134a;
   from 50 to 60% by weight of HFC-32;
   optionally, a lubricant; and
   optionally, a stabilizer.

8. The process of transferring heat as claimed in claim 7, wherein the heat transfer fluid has a lubricant.

9. The process of transferring heat as claimed in claim 7, wherein the heat transfer fluid has a stabilizer.

10. The process as claimed in claim 7, wherein the heat transfer fluid is non-toxic.

11. The process as claimed in claim 7, wherein the heat transfer fluid has an ozone depletion potential of zero.

12. A compression refrigeration system comprising exchangers operating in counterflow mode containing a heat-transfer fluid, the heat transfer fluid consisting of:
   2,3,3,3-tetrafluoropropene;
   from 5 to 25% by weight of HFC-134a;
   from 50 to 60% by weight of HFC-32;
   optionally, a lubricant; and
   optionally, a stabilizer.

13. The compression refrigeration system as claimed in claim 12, wherein the heat transfer fluid is non-toxic.

14. The process as claimed in claim 12, wherein the heat transfer fluid has an ozone depletion potential of zero.

* * * * *